(12) United States Patent
Laakso, Jr. et al.

(10) Patent No.: US 8,835,550 B2
(45) Date of Patent: Sep. 16, 2014

(54) CHLORINATED POLYETHYLENE COMPOSITION, METHOD OF PRODUCING THE SAME, AND ARTICLES MADE THEREFROM

(75) Inventors: Raymond L. Laakso, Jr., St. Francisville, LA (US); Rajen G. Varathungarajan, Pottstown, PA (US); Ashish Batra, Carmel, IN (US); Patricia Ansems Bancroft, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 150 days.

(21) Appl. No.: 13/150,824

(22) Filed: Jun. 1, 2011

(65) Prior Publication Data

US 2011/0305859 A1  Dec. 15, 2011

Related U.S. Application Data

(60) Provisional application No. 61/355,005, filed on Jun. 15, 2010.

(51) Int. Cl.
*C08L 37/00* (2006.01)
*B32B 1/08* (2006.01)
*B32B 15/08* (2006.01)

(52) U.S. Cl.
USPC ........... 524/517; 428/36.9; 428/461; 428/500

(58) Field of Classification Search
CPC ........... C08L 37/00; B32B 1/08; B32B 15/08; B32B 27/00
USPC ........................ 524/517; 428/36.9, 461, 500
See application file for complete search history.

(56) References Cited

U.S. PATENT DOCUMENTS

| | | | |
|---|---|---|---|
| 2,586,363 A | 2/1952 | McAlevy | |
| 3,296,222 A | 1/1967 | Dixon et al. | |
| 3,454,544 A | 7/1969 | Young et al. | |
| 4,591,621 A | 5/1986 | Ennis | |
| 4,767,823 A | 8/1988 | Jones et al. | |
| 5,272,236 A | 12/1993 | Lai et al. | |
| 5,278,272 A | 1/1994 | Lai et al. | |
| 2011/0076502 A1* | 3/2011 | Chaudhary et al. | 428/418 |

* cited by examiner

*Primary Examiner* — Robert D. Harlan

(57) ABSTRACT

The instant invention is a chlorinated polyethylene composition, method of producing the same, and articles made therefrom. The chlorinated polyethylene composition according to the present invention comprises: (a) a chlorinated polyethylene; (b) less than 10 phr by weight of one or more curing agents; (c) from 50 to 150 phr by weight of one or more fillers; (d) from 1 to 8 phr by weight of one or more processing oil; (e) from less than 10 phr by weight of one or more stabilizing agents comprising an acid scavenger; (f) from less than 2 phr by weight of one or more antioxidants; and (g) from 3 to less than 15 phr by weight of an additive polymer comprising the reaction product of an olefin, an acrylate, and a maleic anhydride.

6 Claims, 3 Drawing Sheets

_US 8,835,550 B2_

CHLORINATED POLYETHYLENE COMPOSITION, METHOD OF PRODUCING THE SAME, AND ARTICLES MADE THEREFROM

CROSS-REFERENCE TO RELATED APPLICATIONS

This application is a non-provisional application claiming priority from the U.S. Provisional Patent Application No. 61/355,055 filed on Jun. 15, 2010, entitled "CHLORINATED POLYETHYLENE COMPOSITION, METHOD OF PRODUCING THE SAME, AND ARTICLES MADE THEREFROM," the teachings of which are incorporated by reference herein, as if reproduced in full hereinbelow.

FIELD OF INVENTION

The instant invention relates to a chlorinated polyethylene composition, method of producing the same, and articles made therefrom.

BACKGROUND OF THE INVENTION

Adhesion properties of chlorinated polyethylene based compositions to various substrates such as brass metal substrate and acrylonitrile butadiene rubber compound substrate require further improvements. Currently the available systems lack optimum adhesion properties.

Accordingly, there is a need for chlorinated polyethylene based compositions with improved adhesion properties to various substrates such as brass metal substrates and acrylonitrile butadiene rubber compound substrate.

SUMMARY OF THE INVENTION

The instant invention is a chlorinated polyethylene composition, method of producing the same, and articles made therefrom.

In one embodiment, the instant invention provides a chlorinated polyethylene composition comprising: (a) a chlorinated polyethylene; (b) less than 10 phr by weight of one or more curing agents; (c) from 50 to 150 phr by weight of one or more fillers; (d) from 1 to 8 phr by weight of one or more processing oil; (e) from less than 10 phr by weight of one or more stabilizing agents comprising an acid scavenger; (f) from less than 2 phr by weight of one or more antioxidants; and (g) from 3 to less than 15 phr by weight of an additive polymer comprising the reaction product of an olefin, an acrylate, and a maleic anhydride.

In an alternative embodiment, the instant invention further provides a method for producing a chlorinated polyethylene composition comprising the steps of: (1) selecting a chlorinated polyethylene; (2) selecting less than 10 phr by weight of one or more curing agents; (3) selecting from 50 to 150 phr by weight of one or more fillers; (4) selecting from 1 to 8 phr by weight of one or more processing oil; (5) selecting from less than 10 phr by weight of one or more stabilizing agents comprising an acid scavenger; (6) selecting from less than 2 phr by weight of one or more antioxidants; and (7) selecting from 3 to less than 15 phr by weight of an additive polymer comprising the reaction product of an olefin, an acrylate, and a maleic anhydride; (8) compounding said one or more curing agents, said one or more fillers, said one or more processing oils, said one or more stabilizing agents, said one or more antioxidants, and said ethylene/methyl acrylate/maleic anhydride additive polymer into said chlorinated polyethylene; and (9) thereby producing said chlorinated polyethylene composition.

In another alternative embodiment, the instant invention further provides an article a substrate comprising a metal or a rubber; and the inventive chlorinated polyethylene composition, as described herein above.

In an alternative embodiment, the instant invention provides an article, in accordance with any of the preceding embodiments, except that the article is a hose, tubing, or wire and cable.

In an alternative embodiment, the instant invention provides an article, in accordance with any of the preceding embodiments, except that the article is formed via profile extrusion process, compression molding process, or transfer molding process.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
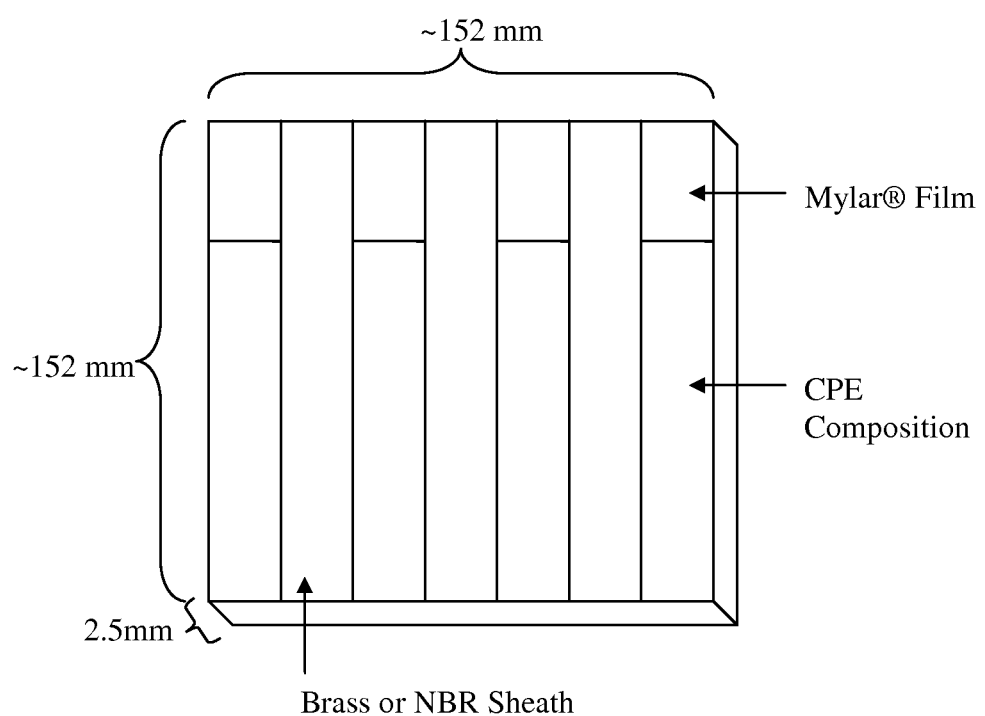
FIG. 1 is a schematic illustration of a plaque.

The instant invention is a chlorinated polyethylene composition, method of producing the same, and articles made therefrom. The chlorinated polyethylene composition comprises: (a) a chlorinated polyethylene; (b) less than 10 phr by weight of one or more curing agents; (c) from 50 to 150 phr by weight of one or more fillers; (d) from 1 to 8 phr by weight of one or more processing oil; (e) from less than 10 phr by weight of one or more stabilizing agents comprising an acid scavenger; (f) from less than 2 phr by weight of one or more antioxidants; and (g) from 3 to less than 15 phr by weight of an additive polymer comprising the reaction product of an olefin, an acrylate, and a maleic anhydride.

a. Chlorinated Polyethylene

The chlorinated polyethylene may be any chlorinated polyethylene polymer; for example, the chlorinated polyethylene polymer may be selected from the group consisting of chlorinated polyethylene homopolymers, and chlorinated copolymers that contain copolymerized units of ethylene, and a copolymerizable monomer. The chlorinated polyethylene polymer may optionally include chlorosulfonyl groups, that is the polymer chain will have pendant chlorine groups and chlorosulfonyl groups. Such polymers are generally known as chlorosulfonated polyethylene polymers.

Representative chlorinated polyethylene polymers include, but are not limited to, a) chlorinated and chlorosulfonated homopolymers of ethylene, and b) chlorinated and chlorosulfonated copolymers of ethylene, and at least one ethylenically unsaturated monomer selected from the group consisting of $C_3$-$C_{10}$ alpha monoolefins, $C_1$-$C_{12}$ alkyl esters of $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids. Chlorinated and chlorosulfonated graft copolymers are also included. Specific examples of suitable polymers include, but are not limited to, chlorinated polyethylene, chlorosulfonated polyethylene, chlorinated ethylene vinyl acetate copolymers, chlorosulfonated ethylene vinyl acetate copolymers, chlorinated ethylene acrylic acid copolymers, chlorosulfonated ethylene acrylic acid copolymers, chlorinated ethylene methacrylic acid copolymers, chlorosulfonated ethylene methacrylic acid copolymers, chlorinated ethylene methyl acrylate copolymers, chlorinated ethylene methyl methacrylate copolymers, chlorinated ethylene n-butyl methacrylate copolymers, chlorinated ethylene glycidyl methacrylate copolymers, chlorinated graft copolymers of ethylene and maleic acid anhydride, chlorinated copolymers of ethylene with propylene, butene, 3-methyl-1-pentene, or octane, and chlorosulfonated copolymers of ethylene with propylene, butene, 3-methyl-1-pentene or octene. The copolymers may be dipolymers, terpolymers, or higher order copolymers.

The chlorinated polyethylene polymers and chlorosulfonated polyethylene polymers may be prepared from polyethylene resins that are branched or unbranched. The polyethylene base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state, or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution, but suspension and non-solvent processes are also known. Preparation of chlorosulfonated olefin polymers is described in U.S. Pat. Nos. 2,586,363; 3,296,222; 3,299,014; and 5,242,987.

The chlorinated polyethylene may comprise up to 45% by weight of units derived from chlorine; for example, the chlorinated polyols that may comprise from 15 to 50% by weight of units derived from chlorine; or in the alternative, from 18 to 50% by weight of units derived from chlorine; or in the alternative, from 30 to 40% by weight of units derived from chlorine.

Such chlorinated polyethylenes are commercially available under the tradename TYRIN™ from The Dow Chemical Company, Midland, Mich., USA.

b. Curing Agent

The chlorinated polyethylene composition comprises less than 10 phr (parts per 100 parts of chlorinated polyethylene) by weight of one or more curing agents; for example, in the range of from 0.1 to less than 10 phr; or in the alternative, from 0.5 to 8 phr; or in the alternative, from 0.5 to 5 phr. Exemplary curing agents include, but are not limited to, peroxides e.g. organic peroxides, and thiadiazoles. Alternatively, curing may be accomplished via electron beam radiation. In one embodiment, exemplary organic peroxides include, but are not limited to to α,α'-bis(tert-butylperoxy)diisopropylbenzene; dicumyl peroxide; and butyl-4,4-bis(t-butylperoxy) valerate. α,α'-bis(tert-butylperoxy)diisopropylbenzene is preferred. In one embodiment, exemplary thiadiazole curing agents include, but are not limited to, dimercaptothiadiazole derivative (e.g. Echo® A, available from Hercules).

When organic peroxide is used as a curing agent, a multifunctional code agent may also be present. Coagents may also be employed if the chlorinated polyethylene composition is to be cured with electron radiation. Examples of such coagents include, but are not limited to, trimethylolpropane trimethacrylate (TMPTMA); triallylcyanurate (TAC); triallylisocyanurate (TAIC); triallyltrimellitate (TATM); and diallylphthalate (DAP). TMPTMA is preferred. When employed in the compositions of the invention, the amount of coagent is typically between 2 to 15 phr (parts per 100 parts of chlorinated polyethylene).

c. Fillers

The chlorinated polyethylene composition comprises from 50 to 150 phr (parts per 100 parts of chlorinated polyethylene) by weight of one or more fillers; for example, from 50 to 100 phr; or in the alternative, from 75 to 150 phr. Examples of suitable fillers include, but are not limited to carbon black, talc, silica, clays, calcium carbonate, titanium dioxide, and colorants.

d. Processing Aids

The chlorinated polyethylene composition comprises from 1 to 8 phr (parts per 100 parts of chlorinated polyethylene) by weight of one or more processing aids; for example, from 1 to 6 phr; or in the alternative, from 1 to 4. Examples of processing aids include, but are not limited to, lubricants such as paraffin wax, oxidized polyethylene wax and Struktol® WB212 (Struktol Company of America).

e. Stabilizing Agents

The chlorinated polyethylene composition comprises from less than 10 phr (parts per 100 parts of chlorinated polyethylene) by weight of one or more stabilizing agents comprising an acid scavenger; for example, from 0.1 to less than 10 phr; or in the alternative, from 0.5 to 8 phr. Exemplary stabilizing agents include, but are not limited to, magnesium oxide and/or magnesium hydroxide. Such stabilizing agents are generally know to person of ordinary skill in the art.

f. Antioxidants

The chlorinated polyethylene composition comprises from less than 2 phr (parts per 100 parts of chlorinated polyethylene) by weight of one or more antioxidants; for example, from 0.1 to less than 2 phr; or in the alternative, from 0.5 to less than 2 phr. Such antioxidants are generally know to person of ordinary skill in the art.

Exemplary antioxidants include, but are not limited to, 3,3',3",5,5',5"-hexa-tert-Butyl-alpha,alpha',alpha"-(mesitylene-2,4,6-triyl)tri-p-cresol (CAS 1709-70-2) commercially available as IRGANOX™ 1330; 1,3,5-trimethyl-2,4,6-tris(3,5-di-tert-butyl-4-hydroxybenzyl)benzene commercially available as ETHANOX™ 330; Pentaerythritol Tetrakis(3-(3,5-di-tert-butyl-4-hydroxyphenyl)propionate) (CAS 6683-19-8) available as IRGANOX™ 1010; Octadecyl-3-(3,5-di-tert.butyl-4-hydroxyphenyl)-propionate (CAS 002082-79-3) available as IRGANOX™ 1076; 1,3,5-tris(3,5-di-tert-butyl-4-hydroxybenzyl)-1,3,5-triazine-2,4,6(1H,3H,5H)-trione (CAS 2767-62-6) available as IRGANOX™ 3114; 1,3,5-TRIS(4-tert-butyl-3-hydroxy-2,6-dimethyl benzyl)-1,3,5-triazine-2,4,6-(1H,3H,5H)-trione (CAS 040601-76) available as Cyanox 1790; Ethylenebis(oxyethylene)bis-(3-(5-tert-butyl-4-hydroxy-m-tolyl)-propionate) (CAS 36443-68-2) available as IRGANOX™ 245; 1,6-Hexamethylene bis(3,5-di(tert)-butyl-4-hydroxyhydrocinnamate (CAS 35074-77-2) available as IRGANOX™ 259; Thiodiethylene bis[3-(3,5-di-tert-butyl-4-hydroxyphenyl)propionate] (CAS 41484-35-9) available as IRGANOX™ 1035; Tris(2,4-ditert-butylphenyl)phosphate (CAS 31570-04-4) available as IRGAFOS™ 168; 2',3-bis[[3-[3,5-di-tert-butyl-4-hydroxyphenyl]propionyl]]propionohydrazide (CAS 32687-78-8) available as IRGANOX™ MD 1024; 2,2'-oxalyldiamidobis [ethyl 3-(3,5-di-t-butyl-4-hydroxyphenyl)propionate] (available as NAUGARD™ XL1); AgeRite™ Resin D and mixtures thereof.

g. Additive Polymer

The chlorinated polyethylene composition comprises from 1 to less than 15 phr (parts per 100 parts of chlorinated polyethylene) by weight of an additive polymer comprising the reaction product of an olefin, an acrylate, and a maleic anhydride; for example, from 3 to less than 15 phr; or in the alternative, from 5 to less than 15 phr; or in the alternative, from 5 to 10 phr; or in the alternative, from 3 to 8 phr; or in the alternative, from 3 to 10 phr. Exemplary additives polymers include, but are not limited to, ethylene/methylacrylate/maleic anhydride terpolymer, ethylene/ethylacrylate/maleic anhydride terpolymer, ethylene/butylacrylate/maleic anhydride terpolymer, terpolymers of an olefin, an acrylate and a maleic anhydride from the group of maleic anhydride, alkyl substituted maleic anhydride, aryl substituted maleic anhydride and halogen substituted maleic anhydride. In one embodiment, exemplary additives polymers include, but are not limited to ethylene/methylacrylate/maleic anhydride terpolymer, ethylene/ethylacrylate/maleic anhydride terpolymer, ethylene/butylacrylate/maleic anhydride terpolymer. In one embodiment, the additive polymer is a random terpolymer of Ethylene (E), Methyl Acrylate (MA) and Maleic Anhydride (MAH) (an ethylene/methyl acrylate/maleic anhydride). Such polymers are commercially available under the tradename LOTADER™ from Arkema.

In a process for producing the chlorinated polyethylene composition according to present invention, the one or more curing agents, as described hereinabove, the one or more fillers, as described hereinabove, the one or more processing aids, as described hereinabove, the one or more stabilizing agents, as described hereinabove, the one or more antioxidants, as described hereinabove, and the additive polymer, as described hereinabove, are compounded into the chlorinated polyethylene, as described hereinabove, via a melt kneading device such as a Banbury mixture or an extruder, e.g. a single screw extruder or a twin screw extruder.

In one embodiment, the method for producing the chlorinated polyethylene composition comprises the steps of: (1) selecting a chlorinated polyethylene; (2) selecting less than 10 phr by weight of one or more curing agents; (3) selecting from 50 to 150 phr by weight of one or more fillers; (4) selecting from 1 to 8 phr by weight of one or more processing aids; (5) selecting from less than 10 phr by weight of one or more stabilizing agents comprising an acid scavenger; (6) selecting from less than 2 phr by weight of one or more antioxidants; and (7) selecting from 3 to less than 15 phr by weight of an additive polymer comprising the reaction product of an olefin, an acrylate, and a maleic anhydride; (8) compounding said one or more curing agents, said one or more fillers, said one or more processing aids, said one or more stabilizing agents, said one or more antioxidants, and said additive polymer into said chlorinated polyethylene; and (9) thereby producing said chlorinated polyethylene composition.

In another embodiment, the method for improving adhesion properties of a chlorinated polyethylene to a substrate comprises the steps of: (1) selecting a chlorinated polyethylene; (2) selecting less than 10 phr by weight of one or more curing agents; (3) selecting from 50 to 150 phr by weight of one or more fillers; (4) selecting from 1 to 8 phr by weight of one or more processing aids; (5) selecting from less than 10 phr by weight of one or more stabilizing agents comprising an acid scavenger; (6) selecting from less than 2 phr by weight of one or more antioxidants; and (7) selecting from 3 to less than 15 phr by weight of an additive polymer comprising the reaction product of an olefin, an acrylate, and a maleic anhydride; (8) compounding said one or more curing agents, said one or more fillers, said one or more processing oils, said one or more stabilizing agents, said one or more antioxidants, and said additive polymer into said chlorinated polyethylene; and (9) thereby improving adhesion properties of said chlorinated polyethylene.

The chlorinated polyethylene composition of the present invention may be formed into various articles such as hose, tubing, wire and cable. The polyethylene composition of the present invention may be formed into various articles via any method generally know to a person of ordinary skill in the art. Such methods include, but are not limited to, profile extrusion process, compression molding process, and transfer molding process. These methods are generally know to a person of ordinary skill in the art.

The articles according to the present invention comprises a substrate comprising a metal such as Brass and/or a rubber such as NBR; and the chlorinated polyethylene composition, as described hereinabove, wherein said chlorinated polyethylene composition is associated with the substrate. In one embodiment, the substrate may, for example, comprise brass metal. In the alternative, the substrate may comprise an acrylonitrile butadiene rubber compound.

EXAMPLES

The following examples illustrate the present invention but are not intended to limit the scope of the invention.

Adhesion properties were tested according to ASTM-D 413 (Adhesion Testing), as described hereinbelow.

Preparing the Plaque

CPE Composition formulations for Inventive Examples 1-2 and Comparative Examples 1-2, as shown in Table 1, were formed into 6 inch (152.4 mm)×6 inch (152.4 mm)×0.98 inch (2.5 mm) (length×width×height) plaques. The CPE composition formulations, as shown in Table 1, were melt blended in a Banbury Mixer, and then rolled on a 6 inch roll mill. A diagram of the dimensions of a plaque is illustrated in FIG. 1 (FIG. 1 is not drawn to scale). The press was preheated to approximately 160° C. with the mold inside of it.

Test Specimen Preparation (Brass)

Inventive Examples 1A-2A, and Comparative Example 1A-2A, were prepared according to the following process, and tested for their adhesion properties (measured in N/mm) to Brass at room temperature (approximately 23° C.). The results are reported in Table 2. The plaques, as described above, were provided. Three brass strips were wiped with methanol. A 2 inch×6 inch piece of Mylar® was placed at the top of the plaque, perpendicular to the direction of the mill (the mill is the direction that the CPE composition was moving while being rolled on the roll mill). Parallel to the mill direction, the three brass strips were placed on the plaque, and then the entire plaque with Brass and Mylar® was placed in the thin press mold. Two other large pieces of Mylar® film (each roughly 16 inches×16 inches) was placed on the top and the bottom to prevent sticking to the mold while being pressed. The mold was placed in the press, the platens were raised, and the plaque with Brass was cured for forty minutes at 160° C. and at 200,000 lbs/pressure over a 1 ft² area (roughly 833.33 lbs/in²). After plaques were cured, they are quench cooled in water, blotted dry, and placed in an ASTM room over night.

Test Specimen Preparation (NBR)

Inventive Examples 1B-2B, and Comparative Example 1B-2B, were prepared according to the following process, and tested for their adhesion properties (measured in N/mm) to NBR at room temperature (approximately 23° C.). The results are reported in Table 3. The plaques, as described above, were provided. Three NBR strips were wiped with methanol. A 2 inch×6 inch piece of Mylar® film was placed at the top of the plaque, perpendicular to the direction of the mill (the mill is the direction that the CPE composition was moving while being rolled on the roll mill). Parallel to the mill direction, the three NBR strips were placed on the plaque, and then the entire plaque with NBR and Mylar® film was placed in the thin press mold. Two other large pieces of Mylar® film (each roughly 16 inches×16 inches) was placed on the top and the bottom to prevent sticking to the mold while being pressed. The mold was placed in the press, the platens were raised, and the plaque with NBR was cured for forty minutes at 160° C. and at 200,000 lbs/pressure over a 1 ft² area (roughly 833.33 lbs/in²). After plaques were cured, they are quench cooled in water, blotted dry, and placed in an ASTM room over night.

Test Specimen Preparation (NBR)

Inventive Examples 1C-2C, and Comparative Example 1C-2C, were prepared according to the following process, and tested for their adhesion properties (measured in N/mm) to NBR at room temperature (approximately 100° C.). The results are reported in Table 3. The plaques, as described above, were provided. Three NBR strips were wiped with methanol. A 2 inch×6 inch piece of Mylar® film was placed at the top of the plaque, perpendicular to the direction of the mill (the mill is the direction that the CPE composition was moving while being rolled on the roll mill). Parallel to the mill direction, the three NBR strips were placed on the plaque, and then the entire plaque with NBR and Mylar® film was placed in the thin press mold. Two other large pieces of Mylar® film (each roughly 16 inches×16 inches) was placed on the top and the bottom to prevent sticking to the mold while being pressed. The mold was placed in the press, the platens were raised, and the plaque with NBR was cured for forty minutes at 160° C. and at 200,000 lbs/pressure over a 1 ft² area (roughly 833.33 lbs/in²). After plaques were cured, they are quench cooled in water, blotted dry, and placed in an ASTM room over night.

T-Peel Test (Adhesion Force)

Figure 2:
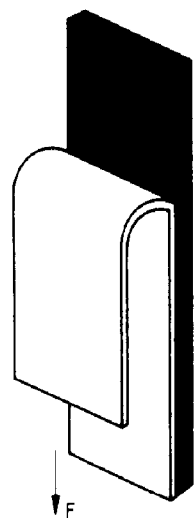
FIG. 2 is a schematic illustration of CPE composition adhering to the metal or NBR.
Figure 3:
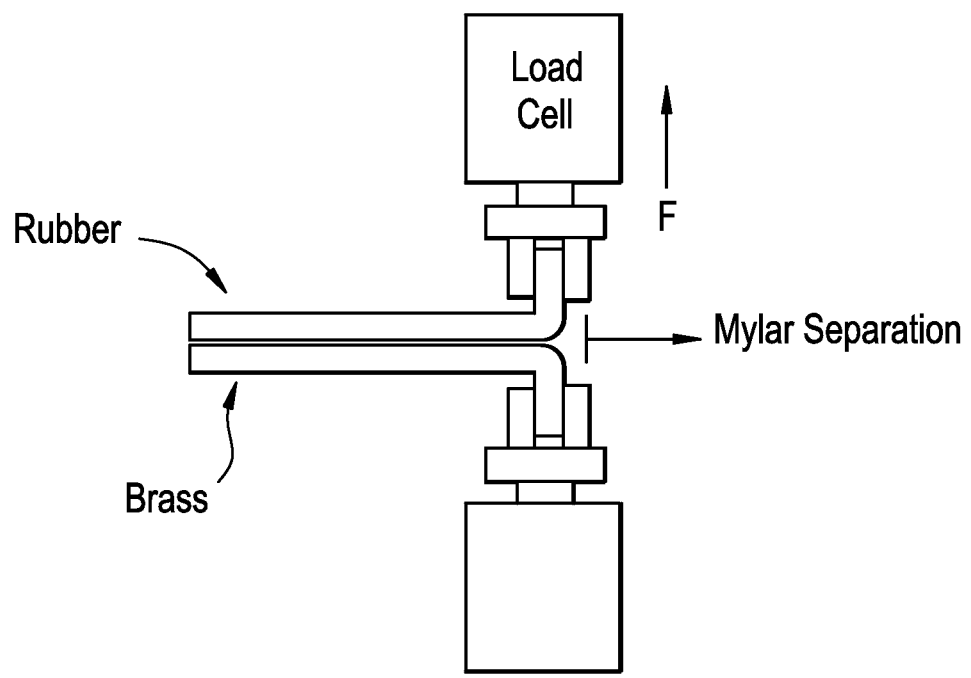
FIG. 3 is a schematic illustration demonstrating the process of determining the peel strengths via an Instron machine.

Once the plaques were cooled and conditioned overnight, the 2 inch×6 inch Mylar® film, wedged between the rubber and either Brass or NBR was removed to expose a separation among the two that will later be used to as a place for the Instron grips. Subsequently, the three metal-to-rubber or NBR-to-Rubber sheaths were trimmed by cutting via scissors, cutting as close to the edge of the metal or NBR as possible. FIG. 2, is a schematic showing CPE composition adhering to the Brass or NBR. The CPE composition is shown as the portion that is folded back while the metal or Brass is the straight edged section. FIG. 3 demonstrates the process of determining the peel strengths via an Instron machine.

The present invention may be embodied in other forms without departing from the spirit and the essential attributes thereof, and, accordingly, reference should be made to the appended claims, rather than to the foregoing specification, as indicating the scope of the invention.

TABLE 1

| | Comparative 1 | Inventive 1 | Comparative 2 | Inventive 2 |
|---|---|---|---|---|
| Density [g/cc] (Formulated CPE Composition) | 1.47 | 1.458 | 1.437 | 1.458 |
| TYRIN™ EXT 1000 (CPE) | 100 | 100 | 100 | 100 |
| Maglite ® D (Magnesium Oxide) | 5 | 5 | 5 | 5 |
| N-762 Carbon Black (Filler) | 75 | 75 | 75 | 67.5 |
| Sundex ® 790TN (Plasticizer) | 20 | 20 | 20 | 20 |
| TOTM (Tri-Octyl Trimellitate) (Plasticizer) | 45 | 45 | 45 | 45 |
| AgeRite ® Resin D (Antioxidant) | 0.25 | 0.25 | 0.25 | 0.25 |
| Paraffin Wax 130 F (Processing aid) | 2 | 2 | 2 | 2 |
| Echo A MB 4842-75% (Thiadiazole Curative) | 3.33 | 3.33 | 3.33 | 3.33 |
| TBAB 4988-MB (50%) (Tetrabutyl ammonium bromide) (Accelerator) | 0.3 | 0.3 | 0.3 | 0.3 |
| Redimix ® 9924 (Chelating Agent) | 1.1 | 1.1 | 1.1 | 1.1 |
| MasterMix ® Curative 5910 (Cure rate Accelerator) | 1 | 1 | 1 | 1 |
| Atomite ® (CaCO3 Filler) | 100 | 100 | 100 | 100 |
| Lotader ® 3430 Resin (Additive Polymer) | 0 | 5 | 15 | 5 |
| HiSil ® 210 (Silica) | 0 | 0 | 0 | 5 |
| Total parts: | 352.98 | 357.98 | 367.98 | 355.48 |

TABLE 2

| | Comparative 1A | Inventive 1A | Comparative 2A | Inventive 2A |
|---|---|---|---|---|
| Adhesion to Brass at 23° C. (N/mm) | 4.94 | 5.54 | 5.84 | 5.6 |
| Percent Change (Inventive vs. Comparative) | — | 12.1 | 18.2 | 13.4 |

TABLE 3

| | Comparative 1B | Inventive 1B | Comparative 2B | Inventive 2B |
|---|---|---|---|---|
| Adhesion to NBR at 23° C. (N/mm) | 3.32 | 4.05 | 3.69 | 4.64 |
| Percent Change (Inventive vs. Comparative) | — | 21.7 | 11.1 | 39.5 |

TABLE 4

| | Comparative 1C | Inventive 1C | Comparative 2C | Inventive 2C |
|---|---|---|---|---|
| Adhesion to NBR at 100° C. (N/mm) | 0.076 | 0.106 | 0.059 | 0.095 |

TABLE 4-continued

|  | Comparative 1C | Inventive 1C | Comparative 2C | Inventive 2C |
|---|---|---|---|---|
| Percent Change (Inventive vs. Comparative) | — | 39.5 | −22.4 | 25 |

TABLE 5

| Mooney Scorch | ASTM-D 1646 | Comparative 1 | Inventive 1 | Comparative 2 | Inventive 2 |
|---|---|---|---|---|---|
| Test Temp | [° C.] | 125 | 125 | 125 | 125 |
| Test Time | [M · m] | 25 | 25 | 25 | 25 |
| Preheat | [M · m] | 1 | 1 | 1 | 1 |
| Rotor Size | | sm | sm | sm | sm |
| Mm (min) | [MU] | 33.5 | 36.4 | 34.2 | 35.1 |
| Change in Mm vs. Control | [%] | — | 8.7 | 2.1 | 4.8 |
| t3 | [M · m] | 8.17 | 8.96 | 10.15 | 10.36 |
| Change in t3 vs. Control | [%] | — | 9.7 | 24.2 | 26.8 |
| t5 | [M · m] | 11.33 | 12.7 | 14.65 | 15 |
| Change in t5 vs. Control | [%] | — | 12.1 | 29.3 | 32.4 |
| t10 | [M · m] | >25 | >25 | >25 | >25 |

TABLE 6

| Original Physical Properties (CM/plaque/t90 = 25%/160° C.) | ASTM-D 412 | Comparative 1 | Inventive 1 | Comparative 2 | Inventive 2 |
|---|---|---|---|---|---|
| 25% Modulus | [MPa] | 1.85 | 1.91 | 2.24 | 1.93 |
| 50% Modulus | [MPa] | 2.75 | 3.14 | 3.61 | 3.14 |
| 100% Modulus | [MPa] | 3.97 | 5.03 | 5.68 | 5.03 |
| 200% Modulus | [MPa] | 6.21 | 7.01 | 7.7 | 6.98 |
| 300% Modulus | [MPa] | 7.95 | 8.55 | 9.2 | 8.49 |
| Tensile | [MPa] | 9.29 | 9.58 | 9.69 | 9.8 |
| Elongation | [%] | 403 | 383 | 341 | 408 |
| Hardness | [Shore A] | 76 | 77 | 79 | 77 |
| Tg by RDS-II | [%] | −30 | −30 | −30 | −30 |

TABLE 7

|  |  | Comparative 1 | Inventive 1 | Comparative 2 | Inventive 2 |
|---|---|---|---|---|---|
| Heat Aging ASTM-573/70.0 hour/100° C. | | | | | |
| Tensile | [Change] | 2.50% | 3.70% | −1.40% | 4.00% |
| Elongation | [Change] | −6.70% | −6.00% | −20.50% | −7.40% |
| Hardness | [Shore A] | 77 | 77 | 79 | 77 |
| Hardness Change | [Points] | 1 | 0 | 0 | 0 |
| RDS Temp Sweep −60 to 60 C. | | | | | |
| | | CM/plaque/t90 + 20%/160° C. | | | |
| Tg | [deg C.] | −30 | −30 | −30 | −30 |
| tan d @ Tg | | 0.755 | 0.764 | 0.689 | 0.72 |
| tan d, 25 C. | | 0.185 | 0.156 | 0.136 | 0.161 |

We claim:

1. A chlorinated polyethylene composition comprising:
    a chlorinated polyethylene;
    less than 10 phr by weight of one or more curing agents;
    from 50 to 150 phr by weight of one or more fillers;
    from 1 to 8 phr by weight of one or more processing oil;
    from less than 10 phr by weight of one or more stabilizing agents comprising an acid scavenger;
    from less than 2 phr by weight of one or more antioxidants; and
    from 3 to less than 15 phr by weight of an additive polymer comprising the reaction product of an olefin, an acrylate, and a maleic anhydride.

2. A method for producing a chlorinated polyethylene composition comprising the steps of:
    selecting a chlorinated polyethylene;
    selecting less than 10 phr by weight of one or more curing agents;
    selecting from 50 to 150 phr by weight of one or more fillers;
    selecting from 1 to 8 phr by weight of one or more processing oil;
    selecting from less than 10 phr by weight of one or more stabilizing agents comprising an acid scavenger;
    selecting from less than 2 phr by weight of one or more antioxidants; and
    selecting from 3 to less than 15 phr by weight of an additive polymer comprising the reaction product of an olefin, an acrylate, and a maleic anhydride;
    compounding said one or more curing agents, said one or more fillers, said one or more processing oils, said one or more stabilizing agents, said one or more antioxidants, and said ethylene/methyl acrylate/maleic anhydride additive polymer into said chlorinated polyethylene; and
    thereby producing said chlorinated polyethylene composition.

3. A method for improving adhesion properties of a chlorinated polyethylene to a substrate:
    selecting a chlorinated polyethylene;
    selecting less than 10 phr by weight of one or more curing agents;
    selecting from 50 to 150 phr by weight of one or more fillers;
    selecting from 1 to 8 phr by weight of one or more processing oil;
    selecting from less than 10 phr by weight of one or more stabilizing agents comprising an acid scavenger;
    selecting from less than 2 phr by weight of one or more antioxidants; and
    selecting from 3 to less than 15 phr by weight of an additive polymer comprising the reaction product of an olefin, an acrylate, and a maleic anhydride;
    compounding said one or more curing agents, said one or more fillers, said one or more processing oils, said one or more stabilizing agents, said one or more antioxidants, and said ethylene/methyl acrylate/maleic anhydride additive polymer into said chlorinated polyethylene; and
    thereby producing said chlorinated polyethylene composition; and
    thereby improving adhesion properties of said chlorinated polyethylene.

4. An article comprising:
    a substrate comprising a metal or a rubber; and
    chlorinated polyethylene composition comprising;
        a chlorinated polyethylene;
        less than 10 phr by weight of one or more curing agents;
        from 50 to 150 phr by weight of one or more fillers;
        from 25 to 100 phr by weight of one or more processing oil;
        from less than 10 phr by weight of one or more stabilizing agents comprising an acid scavenger;

from less than 2 phr by weight of one or more antioxidants; and from 5 to 20 phr by weight of an additive polymer comprising the reaction product of an olefin, an acrylate, and a maleic anhydride.

5. The article of claim 4, wherein said article is a hose, tubing, or wire and cable.

6. The article of claim 5, wherein said article is formed via profile extrusion process, compression molding process, or transfer molding process.

* * * * *